June 1, 1954    R. R. ROESIES    2,679,941
CARGO HANDLING APPARATUS FOR VEHICLES
Filed April 16, 1951    3 Sheets-Sheet 1
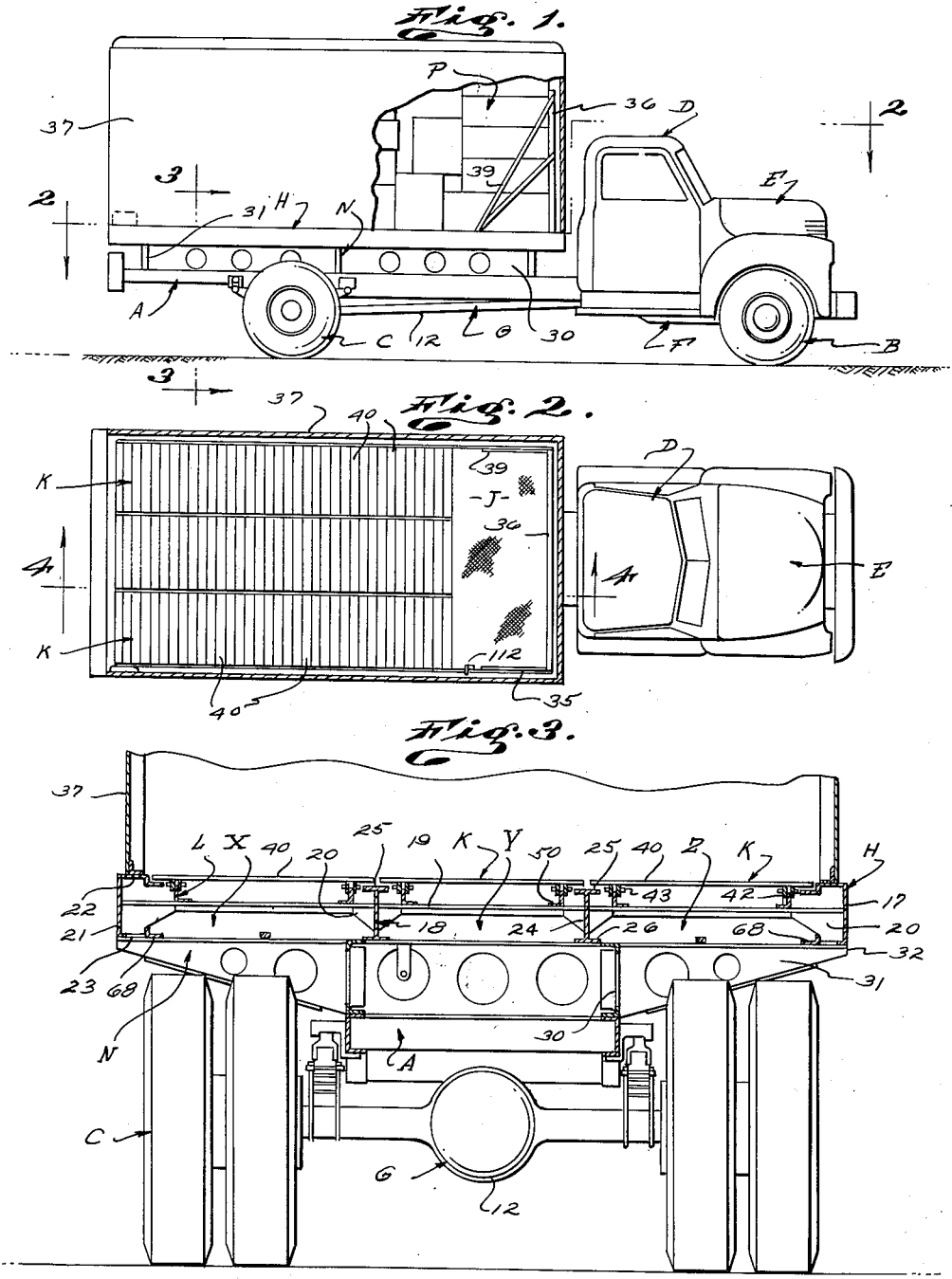
INVENTOR.
Rudolf R. Roesies
BY
Attorney

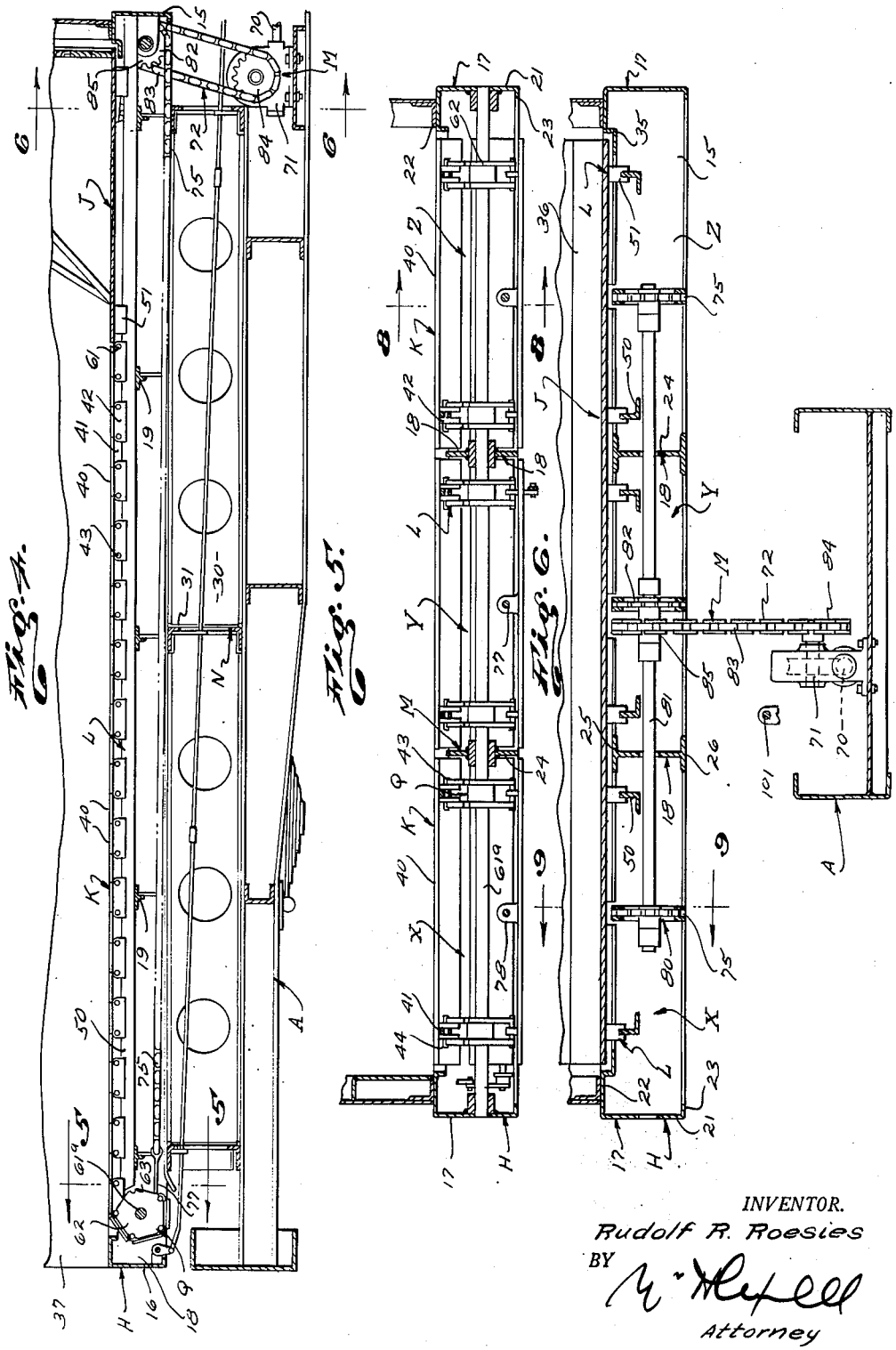

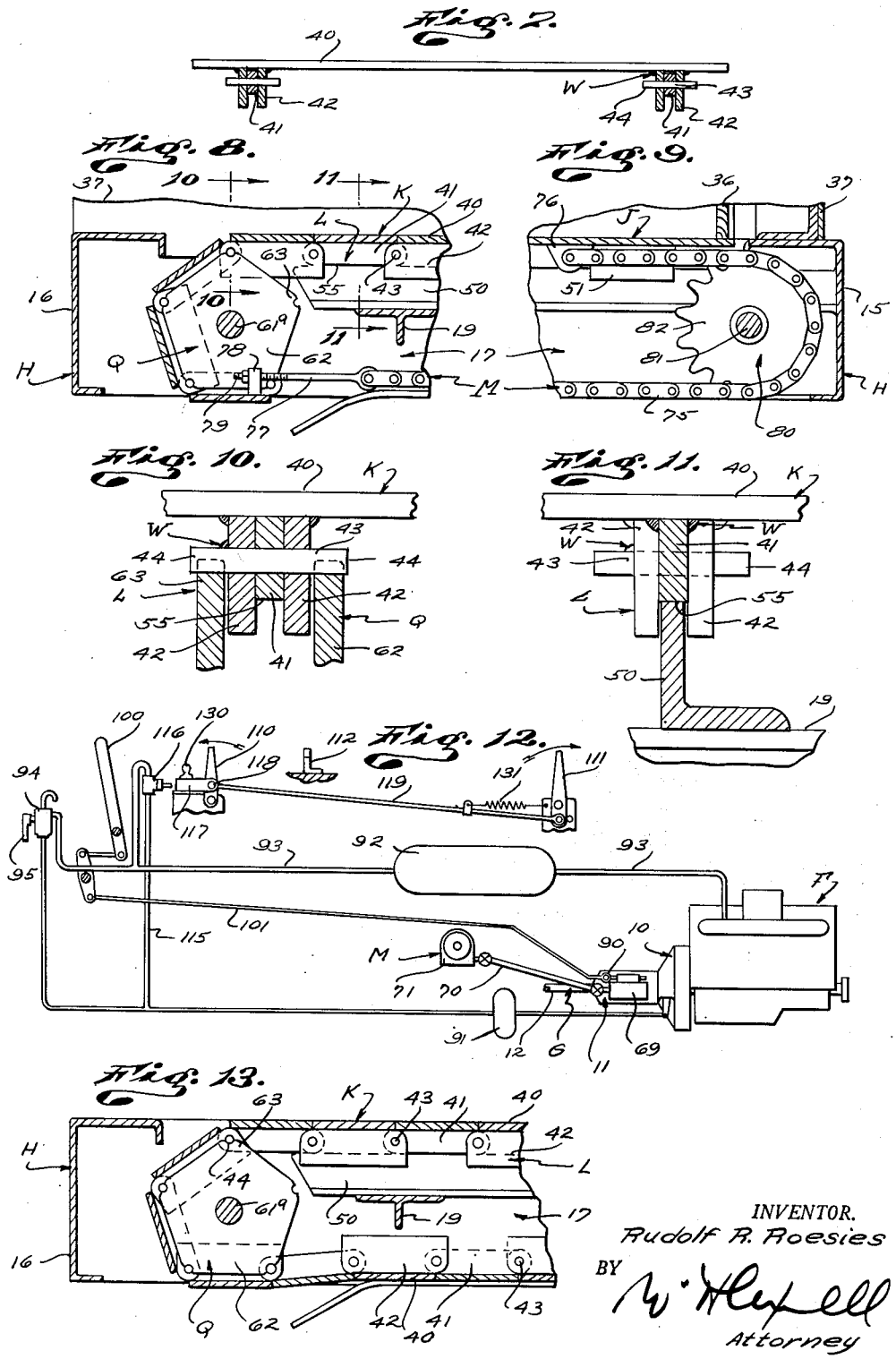

Patented June 1, 1954

2,679,941

UNITED STATES PATENT OFFICE 2,679,941

CARGO HANDLING APPARATUS FOR VEHICLES

Rudolf R. Roesies, Arcadia, Calif.

Application April 16, 1951, Serial No. 221,283

3 Claims. (Cl. 214—83.22)

This invention is concerned with cargo handling apparatus and it is particularly concerned with construction for or to be incorporated in a vehicle such, for example, as a motor vehicle and/or a trailer therefor. It is a general object of the invention to provide a simple, practical, dependable cargo handling mechanism serving to handle quantities of cargo with a minimum of manual labor.

Vehicles such, for example, as motor vehicles in the form of trucks, are employed generally for the handling of cargoes of various kinds, and it is typical of this type of conveyance that it be equipped with a bed on which the cargo is placed or loaded. It is not uncommon in the handling of cargo in the course of depositing it and also in removing it from the usual motor vehicle or truck, that two workmen are employed, one on or in the vehicle and the other on the ground or on a platform adjacent the vehicle. The person in the vehicle receives the cargo at the rear end of the vehicle and stores it in the vehicle, starting at the front and working toward the rear.

It is a general object of this invention to provide a vehicle construction and, more specifically, a platform construction for a vehicle whereby cargo deposited on the platform in the rear of the vehicle is operated forward in the vehicle to a final point of deposit forward of the rear of the vehicle, without requiring manual handling in order to effect such shifting or locating of the cargo.

Another object of the invention is to provide a structure of the general character referred to which is simple and inexpensive of manufacture and which is applicable, generally, to typical or conventional motor vehicles or trucks.

Another object of the invention is to provide a mechanism or apparatus of the general character referred to which involves or provides for adequate framing and supports to the end that it is dependable and effective in the handling of cargo such as is ordinarily handled in a motor vehicle.

Another object of the invention is to provide a structure of the general character referred to involving shiftable cargo carrying elements and operating means therefor by which such elements are effectively shifted in the desired manner longitudinally of the bed of the vehicle.

Another object of the invention is to provide apparatus of the general character referred to including suitable controls for the operating parts making possible simple, convenient operation and assuring operation without hazard to the cargo or to personnel involved in loading or handling the cargo.

The invention is applicable to vehicles generally and is particularly practical as applied to an ordinary or typical motor vehicle such as a cargo carrying or handling truck. In a typical application the invention provides a bed on the truck and a mounting means serves to mount the bed on the frame of the truck, preferably so that the bed extends lengthwise of the truck and overlies the rear wheels thereof in the manner common to the bed of a usual cargo carrying truck. The bed provided by the invention may be an elongate, generally flat structure characterized by a body, and it is provided with shiftable elements, preferably including one or more plates and one or more flexible units. In a typical case the body involves elongate members spaced apart laterally of the bed and supporting means, preferably rails, are carried between the elongate members of the body and support the shiftable elements. The shiftable elements may be varied in character depending upon the service to be employed, and there may be one or more plates and one or more flexible units incorporated in a single structure. It is preferred that a plate, when employed, be organized so that when the vehicle is loaded the plate is at the forward end of the bed and, if desired, the plate may have accessories such as a head board, braces, etc. The flexible elements may be alike and each may involve elongate rests extending transversely of the bed and of limited extent longitudinally thereof. The rests are pivotally connected or linked together to form a chain or chain-like assembly and this assembly is carried on the rails and has its forward end secured to the plate while its rear end is engaged with or around a guide such as a sprocket mechanism. An operating means is provided and preferably derives power from the power mechanism of the vehicle, as from a power take-off. A suitable drive from the power take-off to the shiftable elements of the bed provides for reciprocating the plate lengthwise of the bed and movement of the flexible elements so that they operate around the guide at the rear of the bed. A control means is provided for effecting the desired movement or reciprocation of the shiftable elements and stop means is provided to assure stoppage of the shiftable elements upon their being moved to certain positions.

The various objects and features of my invention will be fully understood from the following detailed description of a typical preferred form and application of the invention, throughout which description reference is made to the accompanying drawings, in which:

Fig. 1 is a side elevation of a typical truck or motor vehicle embodying the invention and showing a portion thereof broken away to illustrate a cargo on the bed provided by the present invention. Fig. 2 is a plan view taken substantially as indicated by line 2—2 on Fig. 1. Fig. 3 is an enlarged transverse sectional view taken substantially as indicated by line 3—3 on Fig. 1. Fig. 4 is an enlarged longitudinal sectional view taken substantially as indicated by line 4—4 on Fig. 2. Fig. 5 is an enlarged transverse sectional view taken as indicated by line 5—5 on Fig. 4. Fig. 6 is an enlarged transverse sectional view taken as indicated by line 6—6 on Fig. 4. Fig. 7 is a tarnsverse sectional view of a flexible support showing it separate from other parts of the structure. Fig. 8 is an enlarged view of a portion of the structure taken as indicated by line 8—8 on Fig. 5. Fig. 9 is an enlarged view of a portion of the structure taken as indicated by line 9—9 on Fig. 6. Fig. 10 is an enlarged transverse sectional view taken as indicated by line 10—10 on Fig. 8. Fig. 11 is an enlarged transverse sectional view taken as indicated by line 11—11 on Fig. 8. Fig. 12 is a diagrammatic view illustrating the system of controls and stop means as provided by the invention, and Fig. 13 is a view similar to Fig. 8, showing the parts in a different position.

A vehicle in which or to which the present invention is applicable may be a typical motor vehicle such as a truck and for purpose of illustration I have shown in the drawings a common or conventional form of truck having an elongate frame A, front supporting wheels B, rear supporting wheels C, a cab D, a hood E, a power plant or engine F enclosed by the hood and a drive G from the engine to the rear wheels C. In accordance with conventional truck construction, the frame A is an elongate narrow unit or structure extending throughout the length of the vehicle and projecting a substantial distance rearward of the wheels C. The drive G is of typical form and construction and involves, generally, a clutch mechanism 10, a transmission 11 and a mechanical drive 12 from the transmission to the wheels C.

The present invention provides a cargo carrying bed and a mounting means supporting the bed on or from the frame A of the vehicle. The bed is preferably an elongate structure substantially coextensive with the frame at the rear of the cab D and it may be of any suitable width, being preferably such as to extend over or outward of the wheels C. In a typical construction the bed involves, generally, a body H, a plurality of shiftable elements such as one or more plates J and flexible elements K, supporting means L for the shiftable elements, operating means M for the shiftable elements, and various other features and elements of construction hereinafter referred to.

The body H of the bed may be varied considerably in form and construction depending upon the selection of other features and upon the class of service to be performed. In a typical case the body H involves a transverse front end member 15, a transverse rear end member 16, and a plurality of longitudinal members. In the case illustrated the longitudinal members involve side members 17 at the sides of the body, and inner or intermediate members 18 spaced apart laterally of the body and extending longitudinally thereof. In the particular case illustrated there are two intermediate longitudinal members 18 and they are spaced from each other and from the side members 17 so that the body, in effect, defines three like or equally shaped and sized longitudinal compartments X, Y and Z. In the preferred construction the longitudinal members extend continuously between the end members 15 and 16 and are permanently anchored or fixed thereto and it is preferred that the bory further include a plurality of transversely disposed members in the form of spacers 19 extending between adjacent longitudinal members and spaced apart lengthwise of the body. The spacers are of limited vertical extent to occur within the confines of the body and it is preferred that they be joined to the longitudinal members of the body by gusset plates 20 that serve to materially strengthen and stiffen the structure generally.

In the particular form of the invention illustrated the side body members 17 are inwardly faced channel-shaped elements each with a vertically disposed web 21 and an upper inwardly projecting flange 22 and a lower inwardly projecting flange 23. The intermediate members 18 of the body are shown as "I" sections, each with a vertical web 24, upper flanges 25 projecting in opposite directions from the web 24, and lower flanges 26 projecting in opposite directions from the web 24. In the preferred form of the invention the several elements entering into the body of the platform, as hereinabove pointed out, are integrally or permanently joined so that the body is a substantially rigid frame-like unit.

A mounting means N is provided for mounting the body H on the frame A of the vehicle and in the particular case illustrated it involves transverse beams 31 spaced apart longitudinally of the mounting or of the bed and extending transversely thereof so that the beam supports the members 18 of the bed and so that the outer ends 32 of the beams terminate flush with and support the side members 17 of the bed. Longitudinal stringers 30 extend longitudinally of the frame A between the beams 31 to brace them. In the case illustrated, the beams and the stringers rest upon the frame A. In the preferred construction, as where the body of the bed is substantially flat, as hereinabove described, and as shown throughout the drawings, the tops of the elements entering into the mounting N are flat and flush to form an effective support for the body H of the bed. It is to be understood, of course, that the body of the bed can be fixed or joined to the mounting means in any suitable manner, it being generally preferred that these parts be fixed or integrally joined to provide a secure, dependable construction.

In carrying out the present invention the bed may be provided with one or more shiftable plates J in the nature of cargo platforms. In the case illustrated, the structure has a single platform plate J and this element is shown as a flat simple rigid plate rectangular in plan configuration and extending transversely of the bed. The platform plate J illustrated is elongate in form and its ends 35 terminate just inside the side members 17 of the body H. The width of the plate J may be varied as circumstances require, it being ordinarily such as to form a reasonable support for a stack or pile of cargo P such as is shown in Fig. 1 of the drawings.

In the particular case illustrated the platform plate J is provided with suitable accessories such, for example, as a headboard 36 which is fixed to and projects upward from the forward or foremost edge of the plate. In a case where the vehicle is provided with an enclosure or body 37 the headboard may be such as to extend a substantial distance upwardly in the body, but is clear of the top so that the plate can shift longitudinally in the body without interfering therewith. When a headboard 36 is used, as shown in the drawings, suitable reinforcements or braces 39 can be employed to rigidly establish the headboard perpendicular to the plate.

In accordance with the present invention the structure may include one or more flexible elements or platform units, and in the case illustrated it involves a plurality of such units, there being one in each of the chambers or compartments X, Y and Z, established in or by the bed body H. In a structure where there are two intermediate members 18 in the body, arranged as above described, there are three flexible platform elements or units, and these may be made so that they are of equal size and character, as shown throughout the drawings.

In the preferred form of the invention, each flexible platform unit or element K involves a plurality of like elongate rests 40 and means linking or pivotally connecting the rests so as to establish an elongate, flexible or chain-like structure. In the case illustrated the rests are of equal size and shape and they extend transversely of the bed to be substantially coextensive in width with the chambers X, Y and Z, as shown in Fig. 5 of the drawings. The several rests 40 may be joined or linked together in any suitable manner so that when they are in a common plane they form a flat substantially continuous platform or support. In the case illustrated, certain of the rests 40, in fact, every other rest, lengthwise of the flexible platform, has depending lugs 41 while the other or intervening rests have depending lugs 42. The lugs 41 and 42 have overlapping portions joined by pivot pins 43. In the preferred form of the invention there is a single depending lug 41 at the end portion of each of the first mentioned rests, whereas the said intervening or other rests have two spaced depending lugs 42 at each end portion arranged so that lugs 41 are entered between them in the manner illustrated in Fig. 10 of the drawings. In the preferred form of the invention the pins 43 that pivotally connect the lugs 41 and 42 are fixed or anchored in place as by welding W, or the like, and they have projecting end portions 44 that function as hereinafter described.

In accordance with the present invention the mounting or supporting means L serves to support the platform or shiftable elements J and K for movement lengthwise of the body H, and in the preferred form of the invention a single or common means L further supports the plate type element J as well as the flexible elements K.

In the case illustrated each flexible element K is supported by a track in the body H formed by longitudinally disposed rails 50, the rails being located in the compartment or chamber of the body H where the flexible element K is located, and being supported on or carried by elements of the body as, for instance, by the transverse spacers 19 of the body, as shown throughout the drawings. In the particular case illustrated, the mounting or support of the plate J on the rails 50 is completed by means of suitable shoes 51 that depend from the bottom of the plate J to engage or fit onto or over the upper edge portions of the rails. In the case of the flexible shiftable elements K the lugs 41 hereinabove described are provided with flat or smooth lower edges 55 located to slide on the upper edges of the rails 50 and the lugs 42 are proportioned to depend below the edges 55 and at the sides of the rails to retain the lugs 41 in proper engagement with the rails. This particular arrangement and relationship of parts is clearly illustrated in Fig. 11 of the drawings.

In accordance with the preferred form of the invention the several flexible elements or platform units K are so located in or carried by the body H as to be in a common plane or flush with each other, and they extend longitudinally of the body. The forward or foremost ends of the elements K are joined or connected to the plate J, it being preferred that they be linked thereto as by pivot pins 61. In the rear of the body H the flexible elements K are supported or guided by suitable guide means Q and in the preferred form of the invention the guide means involves a shaft 61ª carried by the body H to extend transversely thereof immediately inside the rear transverse member 16 of the body, and sprocket wheels 62 are carried by the shaft 61ª and are spaced along the shaft. As the chain like structure of an element K is operated over the guide Q, end portions 44 of each pivot pin 43 engage in and are supported by suitable portions 63 of the sprockets. Through this construction or guide means the rear end portions of the flexible elements K are engaged around the guides and face or lead forward or toward the front of the body.

It is preferred, in practice, that the body construction be such as to support the flexible elements K upon their rearmost end portions being drawn forward and beneath the portions that are uppermost and which form platforms. In the case illustrated the lower flanges 26 of the intermediate longitudinal members 18 of the body form supports for the rests 40 and where such flanges are not present specially designed longitudinal rests 68 are provided.

The operating means M serves as a construction by which the shiftable elements J and K can be operated by means of a suitable power plant such as the engine F of the vehicle. In the particular case illustrated the means M derives power from a reversible power take-off 69 provided at the transmission 11. In the case illustrated, the operating means involves a drive shaft 70 coupled to and driven by the power take-off, a speed reducing mechanism 71 driven by the shaft 70 and a suitable drive 72 from the mechanism 71 to the shiftable elements J and K. In the particular case illustrated the connection between the elements J and K and the drive 72 involves flexible ties between the rearmost ends of the flexible elements K and the plate element J, which ties are preferably in the form of chains 75, it being preferred that there be one chain for each element K. In the particular case illustrated, one end of each chain is anchored to the plate J by a depending lug 76 on the plate, and it is adjustably connected to the rear end of a flexible element by a coupling member 77 passing through a lug 78 and threaded at 79 to provide for adjustment.

The chains 75 are provided with guide means at the forward end portion of the body and, in the case illustrated, the guide means 80 involves a shaft 81 extending transversely of the body and sprockets 82 on the shaft 80 carrying the chains

75. When this particular type of construction is employed the drive 72 from the speed reducer to the elements J and K may involve a simple chain drive involving a chain 83 running over a drive sprocket 84 operated by the mechanism 71 and over a driven sprocket 85 on the shaft 81.

In a typical application of the invention employing construction such as I have described, the shiftable elements J and K are preferably supported by the means L so that they combine to form or establish a flat substantially continuous top for the bed which top is flush with the top of the body H, as shown throughout the drawings. It will be apparent from the drawings that the shiftable elements J and K and the body H can be designed and related so that the platform formed by the elements J and K occupies substantially the entire top of the bed. Further, it will be apparent from the drawings, for instance, from Fig. 4 of the drawings, that the parts can be arranged and related so that when the platform element J is in a forward position or at the forward end of the body H the flexible elements K extend rearwardly therefrom at the rear end of the frame, as clearly shown in Fig. 2 of the drawings. As the operating means is actuated or operated to rotate the shaft 81 in a counterclockwise direction, the rear end portions of the flexible elements K are drawn forward and beneath the upwardly facing portions and the structure may be operated until the plate J is moved to a position at the rear end of the body H.

Control means for the operating means M, hereinabove described, may involve means for controlling the clutch 10 and for operating the control or reversing element 90 of the power take-off 69. In the case illustrated, a fluid pressure motor or actuating device 91 is provided for operating the clutch 10. A pressure tank 92 is provided and in the case illustrated carries sub-atmospheric pressure maintained as through a line 93 from a suitable part of the engine F. The tank 92 may, in practice, be a sub-atmospheric pressure tank included in the vehicle for other purposes. A line 93 extends from tank 92 to the motor 91 and a suitable control valve 94 is included in the line 93. In practice, the control valve 94 can be located at the rear of the vehicle or wherever convenient, and may be subject to operation by a suitable hand lever 95.

In the particular arrangement illustrated diagrammatically in Fig. 12, the motor 91 is such, or is of a type that normally positions the clutch 10 so that it is engaged. The arrangement is such that the valve 95 may be operated so that the reduced pressure present in tank 92 is communicated to the motor 91 resulting in operation of motor 91 so that the clutch 10 is opened or disengaged. Combined with this mechanism is a lever 100 that may be located adjacent or in the vicinity of the valve handle 95 and a suitable connection 101 between the lever 100 and the element 90 of the power take-off by which its direction of operation can be reversed. As is typical of this type of mechanism, the power take-off reversing means has a neutral position and consequently the lever 100 has a neutral position. Operation of the lever 100 in one direction from the neutral position engages take-off 69 to drive in one direction, whereas operation of the lever 100 in the opposite direction engages the drive 69 to operate in the opposite direction.

In accordance with the present invention, I provide a stop means serving to stop the shiftable elements J and K upon the shifting structure formed thereby reaching either extreme position, that is, upon the plate J reaching the forward end of the body or upon its reaching the rear end of the body. In the case illustrated, the stop means involves spaced pivoted stops 110 and 111 adapted to be operated by an arm or projection 112 on a suitable part of the shifting structure. For the purpose of example, stop lever 110 is positioned so that it is operated by arm 112 when the plate J reaches the rearmost position, while the stop lever 111 is positioned to be operated by arm 112 when the plate J reaches its foremost position. A bypass connection 115 is provided in line 93 around the valve 94 and a normally closed valve 116 is provided in the bypass.

An actuator 117 for operating or opening valve 116 is connected to the levers 110 and 111. In the case illustrated the actuator 117 is connected to lever 110 by a pin 118, and a link 119 connects the levers 110 and 111. As a result of this construction and arrangement, operation of lever 110 rearwardly or as indicated by the arrow in Fig. 12 will open valve 116, whereas operation of lever 111 forwardly or in the direction indicated by the arrow will open valve 116. When valve 116 is open, pressure from tank 92 is communicated to motor 91 and the clutch 10 is released. Following stopping of the operating means through the mechanism just described, the stop means is disengaged and the control means again established in control by shifting of the actuator 117 out of engagement with the valve 116. In practice, a handle 130 may be provided on the actuator 117 in the vicinity of the handle 95 and lever 100 so that the actuator 117 can be conveniently operated about the pivot 118.

The stop mechanism above described further includes a spring 131 which is connected with the rod 119 and serves to normally yieldingly hold the levers 110 and 111 in unactuated positions.

In employing the construction that I have provided for the handling of cargo, loading of the vehicle can be advantageously accomplished by operating the platform P to the rear end of the body H. With the platform in this position, packages, parcels, or other suitable cargo P can be loaded onto the platform and, if desired, against the headboard 36 by a person standing on the ground on which the vehicle is located, or by a person operating on a loading dock platform or the like. When the desired quantity of cargo has been placed on platform J, the control means is actuated so that the operating means effects movement or shifting of the elements J and K until the platform J has advanced a suitable distance forward from the rearmost position. The initial shifting may be such as to expose a limited portion of the flexible elements K, or only enough of the elements K to be within reach of or convenient to the person loading the cargo. When these portions of the elements K have been loaded in the desired manner, the mechanism can be again operated in the manner just described, advancing the loaded portions forward and exposing other portions of the elements K to be loaded.

It will be obvious that as a result of this mode of operation a single person can, conveniently, quickly and advantageously, load the entire vehicle, to the end that the entire bed is loaded or occupied, without the said person having ever entered the vehicle or advanced therein to the forward end portion thereof where the initially loaded cargo is finally deposited. When it is desired to unload parcels, packages, or other cargo, the operation above described is reversed, that is, the cargo in or on the rear of the bed is first removed, and as cargo is required to be accessilbe for unloading, the structure is actuated, moving the shiftable parts rearwardly until the platform J reaches the rear end portion of the body H.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A cargo carrying arrangement for vehicles including, a bed comprising an elongate body having end members, side beams extending between the end members, intermediate beams parallel with and spaced between the side beams and extending between the end members and transverse beams extending transversely of the body and between the side and intermediate beams, the beams extending between the end members establishing spaced longitudinal chambers in the body, rails carried by the transverse beams and extending longitudinally of the body, there being a pair of rails in each chamber, a rigid cargo carrying platform carried by each pair of rails, a flexible cargo platform carried by each pair of rails and connected to the rigid platform supported thereby to move therewith, guide means at one end of the body around which the flexible platforms are trained, and means adapted to operate the platforms lengthwise of the body, flexible ties extending between the portions of the flexible platforms passed around the guide means and the rigid platform, a rotatable guide at the other end of the body around which the ties are engaged, operating means actuating the platforms and ties relative to the body including a power supplying means, a shaft connected to said power supplying means and actuated thereby, and a speed reducing mechanism operated by the shaft and driving said guides, and control means for said operating means including an actuator for connecting or disconnecting said power supplying means, means for causing said actuator to connect said power supplying means and means for causing said actuator to disconnect said power supplying means automatically upon travel of said rigid cargo platform through a predetermined distance, said means for causing said actuator to disconnect said power supplying means automatically including a fluid pressure motor for disconnecting said power supplying means, a source of fluid pressure connected to said fluid pressure motor, a control valve connected between said fluid pressure source and said fluid pressure motor, pivotal stop means spaced from each other longitudinally of the body and adapted to actuate said valve, said stop means defining the limits of travel of said platforms, and a projection carried by one of said platforms for contacting said pivoted stop means to actuate said valve to supply pressure to said fluid pressure motor from said fluid pressure source to disconnect said power supplying means.

2. A cargo carrying arrangement for vehicles including, a bed comprising an elongate body having end members, side beams extending between the end members, intermediate beams parallel with and spaced between the side beams and extending between the end members and transverse beams extending transversely of the body and between the side and intermediate beams, the beams extending between the end members establishing spaced longitudinal chambers in the body, rails carried by the transverse beams and extending longitudinally of the body, there being a pair of rails in each chamber, a single rigid cargo platform carried by the several pairs of rails, separate parallel flexible cargo platforms, each carried by a pair of rails and all connected to one edge of the rigid platform to move with the rigid platform, guide means at one end of the body around which the flexible platforms are trained, flexible ties extending between the portions of the flexible platforms passed around the guide means and the rigid platform, a rotatable guide at the other end of the body around which the ties are engaged, a guide carried by the body below the transverse beams supporting the portions of the flexible platforms passed around the guide means, operating means actuating the platforms and ties relative to the body including a power supplying means, a shaft connected to said power supplying means and actuated thereby and a speed reducing mechanism operated by the shaft and driving said guides, and control means for said operating means including an actuator for connecting or disconnecting said power supply means, means for causing said actuator to connect said power supplying means and means for causing said actuator to disconnect said power supplying means automatically upon travel of said rigid cargo platform through a predetermined distance.

3. A cargo carrying arrangement for vehicles as claimed in claim 2, wherein the means for causing said actuator to disconnect said power supplying means automatically includes a fluid pressure motor for disconnecting said power supplying means, a source of fluid pressure connected to said fluid pressure motor, a control valve connected between said fluid pressure source and said fluid pressure motor, pivotal stop means spaced from each other longitudinally of the body and adapted to actuate said valve, said stop means defining the limits of travel of said platforms, and a projection carried by one of said platforms for contacting said pivoted stop means to actuate said valve to supply pressure to said fluid pressure motor from said fluid pressure source to disconnect said power supplying means.

References Cited in the file of this patent

UNITED STATES PATENTS

| Number | Name | Date |
|---|---|---|
| 1,251,372 | Hewitt | Dec. 25, 1917 |
| 1,289,513 | Mott | Dec. 31, 1918 |
| 1,375,535 | Ortgier | Apr. 19, 1921 |
| 1,717,843 | Hollnagel | June 18, 1929 |
| 1,809,054 | Mattison | June 9, 1931 |
| 2,140,974 | Wagner et al. | Dec. 20, 1938 |
| 2,394,006 | Osgood | Feb. 5, 1946 |
| 2,443,947 | Brooks et al. | June 22, 1948 |
| 2,467,354 | Baldwin | Apr. 12, 1949 |
| 2,512,339 | Knapp, Jr. | June 20, 1950 |
| 2,552,953 | Gaddis | May 15, 1951 |